(12) United States Patent
Ishitsuka et al.

(10) Patent No.: US 9,719,824 B2
(45) Date of Patent: Aug. 1, 2017

(54) THERMAL AIR FLOW SENSOR

(71) Applicant: Hitachi Automotive Systems, Ltd., Hitachinaka-shi, Ibaraki (JP)

(72) Inventors: Norio Ishitsuka, Tokyo (JP); Yasuo Onose, Hitachinaka (JP); Noriyuki Sakuma, Tokyo (JP); Hiroshi Nakano, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 288 days.

(21) Appl. No.: 14/418,330

(22) PCT Filed: Jun. 28, 2013

(86) PCT No.: PCT/JP2013/067758
§ 371 (c)(1),
(2) Date: Jan. 29, 2015

(87) PCT Pub. No.: WO2014/021034
PCT Pub. Date: Feb. 6, 2014

(65) Prior Publication Data
US 2015/0300857 A1   Oct. 22, 2015

(30) Foreign Application Priority Data
Aug. 1, 2012 (JP) ................................. 2012-170737

(51) Int. Cl.
*G01F 1/692* (2006.01)
*G01F 1/684* (2006.01)

(52) U.S. Cl.
CPC ............ *G01F 1/692* (2013.01); *G01F 1/6842* (2013.01); *G01F 1/6845* (2013.01)

(58) Field of Classification Search
CPC ....... G01F 1/6845; G01F 1/692; G01F 1/6842
See application file for complete search history.

(56) References Cited

U.S. PATENT DOCUMENTS 6,240,777 B1 * 6/2001 Treutler ................ G01F 1/6845
                                                            73/204.11
6,490,915 B2 * 12/2002 Yamada ................ G01F 1/6845
                                                            123/494

(Continued)

FOREIGN PATENT DOCUMENTS

JP    11-194043 A    7/1999
JP    11-330050 A    11/1999

(Continued)

OTHER PUBLICATIONS

International Search Report (PCT/ISA/210) dated Oct. 8, 2013 with English translation (five pages).

*Primary Examiner* — Freddie Kirkland, III
(74) *Attorney, Agent, or Firm* — Crowell & Moring LLP (57) ABSTRACT

A thermal air flow sensor that offers high flow rate measurement accuracy is provided. The thermal air flow sensor includes a measuring element. The measuring element includes: a semiconductor substrate; a heating resistor and a temperature measuring resistor both formed as a result of thin films being stacked over the semiconductor substrate; an electronic insulator including a silicon oxide film; and a diaphragm portion formed after part of the semiconductor substrate is removed. The heating resistor and the temperature measuring resistor are formed over the diaphragm portion. In the thermal air flow sensor, a ratio of an area occupied by the thin films to an area of the measuring element ranges between 40% and 60%.

5 Claims, 5 Drawing Sheets (56) References Cited

U.S. PATENT DOCUMENTS

| | | | | |
|---|---|---|---|---|
| 8,429,964 B2* | 4/2013 | Sakuma | ............... | B81B 3/0072 |
| | | | | 73/204.26 |
| 2004/0091797 A1* | 5/2004 | Inoue | ....................... | G03F 1/36 |
| | | | | 430/5 |
| 2007/0113644 A1* | 5/2007 | Manaka | .................. | G01F 1/684 |
| | | | | 73/204.26 |
| 2009/0188314 A1* | 7/2009 | Sakuma | ............... | G01F 1/6845 |
| | | | | 73/204.26 |
| 2010/0139391 A1* | 6/2010 | Sakuma | ............... | B81B 3/0072 |
| | | | | 73/204.26 |
| 2011/0107832 A1* | 5/2011 | Sakuma | ............... | G01F 1/6842 |
| | | | | 73/204.26 |

FOREIGN PATENT DOCUMENTS

| | | | |
|---|---|---|---|
| JP | 2002-296754 A | 10/2002 |
| JP | 2004-304147 A | 10/2004 |
| JP | 2010-133897 A | 6/2010 |

\* cited by examiner

THERMAL AIR FLOW SENSOR

TECHNICAL FIELD

The present invention relates generally to air flow sensors measuring an intake air flow rate and more particularly to a thermal air flow sensor that includes a heating resistor and a temperature measuring resistor to measure an air flow rate.

BACKGROUND ART

Thermal air flow sensors capable of directly detecting an air flow rate have been a mainstream trend in the air flow sensor. Particularly gaining attention are thermal air flow sensors including measuring elements fabricated in a semiconductor micromachining technique because of their lower cost and capability of being driven at low electric power. Patent Document 1 discloses a measuring element included in such a thermal air flow sensor. The thermal air flow sensor disclosed in Patent Document 1 includes an electric insulating film formed over a semiconductor substrate, thin films of a heating resistor and a temperature measuring resistor formed over the electric insulating film, and an electric insulator formed over the heating resistor and the temperature measuring resistor. The thermal air flow sensor further includes a diaphragm structure formed in a region in which the heating resistor and the temperature measuring resistor are formed. The diaphragm structure is formed after part of the semiconductor substrate is removed as a result of anisotropic etching performed from a back side of the semiconductor substrate.

PRIOR ART DOCUMENT

Patent Document

Patent Document 1: JP-1999-194043-A

SUMMARY OF THE INVENTION

Problem to be Solved by the Invention

Figure 7A:
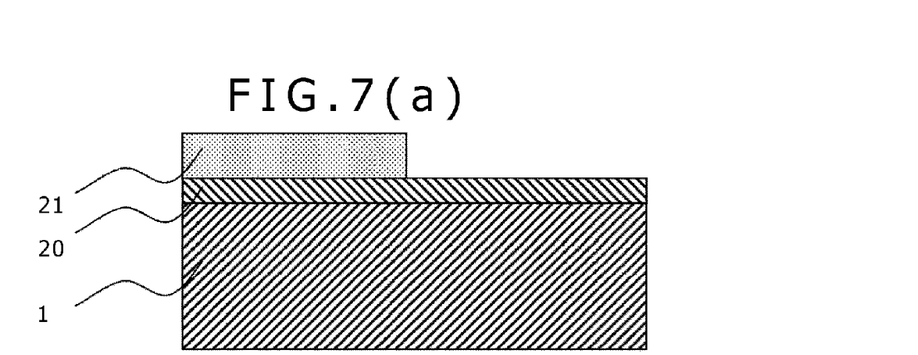
FIG. 7(a) is a diagram showing a resist stacked over a thin film before thin film processing.
Figure 7B:
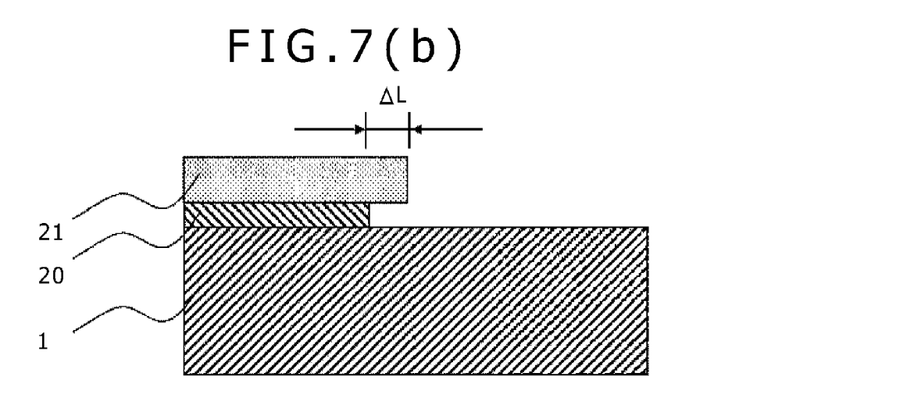
FIG. 7(b) is a diagram showing an exemplary variation in dimension during thin film processing.
Figure 8:
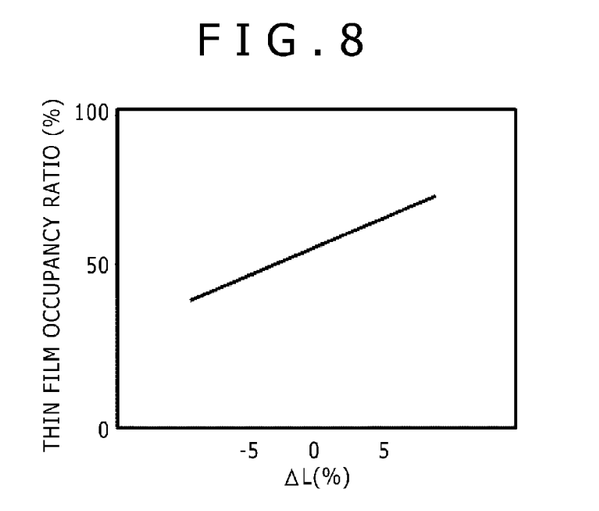
FIG. 8 is a graph showing a thin film occupancy ratio and variations in dimension.

Thin-film patterning is generally performed as shown in FIGS. 7(a) and 7(b). A thin film 20 is first stacked before a resist 21 is stacked over the thin film 20 and patterned. With the resist (original) 21 used as a mask, a thin film is patterned by means of dry etching.

The thin film is ideally patterned to the exact dimensions of the resist (original) 21; however, a condition as shown in FIG. 7(b) results depending on a ratio of a total area of a thin-film pattern in the measuring element to an area of the measuring element (thin film occupancy ratio). Specifically, the pattern will be narrower relative to a design (mask) dimension when the thin film occupancy ratio is small and be thicker relative to the design dimension when the thin film occupancy ratio is large. If variations in dimension are large, the measurement accuracy of a thermal air flow meter will decline.

An object of the present invention is to provide a thermal air flow sensor offering high flow rate measurement accuracy.

Means for Solving the Problem

To achieve the foregoing object, the present invention provides a thermal air flow sensor including a measuring element, the measuring element having: a semiconductor substrate; a heating resistor and a temperature measuring resistor both formed as a result of thin films being stacked over the semiconductor substrate; an electronic insulator including a silicon oxide film; and a diaphragm portion formed after part of the semiconductor substrate is removed. The heating resistor and the temperature measuring resistor are formed over the diaphragm portion. A ratio of an area occupied by the thin films to an area of the measuring element ranges between 40% and 60%.

Advantages of the Invention

The present invention can provide a thermal air flow sensor with high flow rate measurement accuracy.

MODES FOR CARRYING OUT THE INVENTION

An embodiment of the present invention will be described below.

Figure 10:
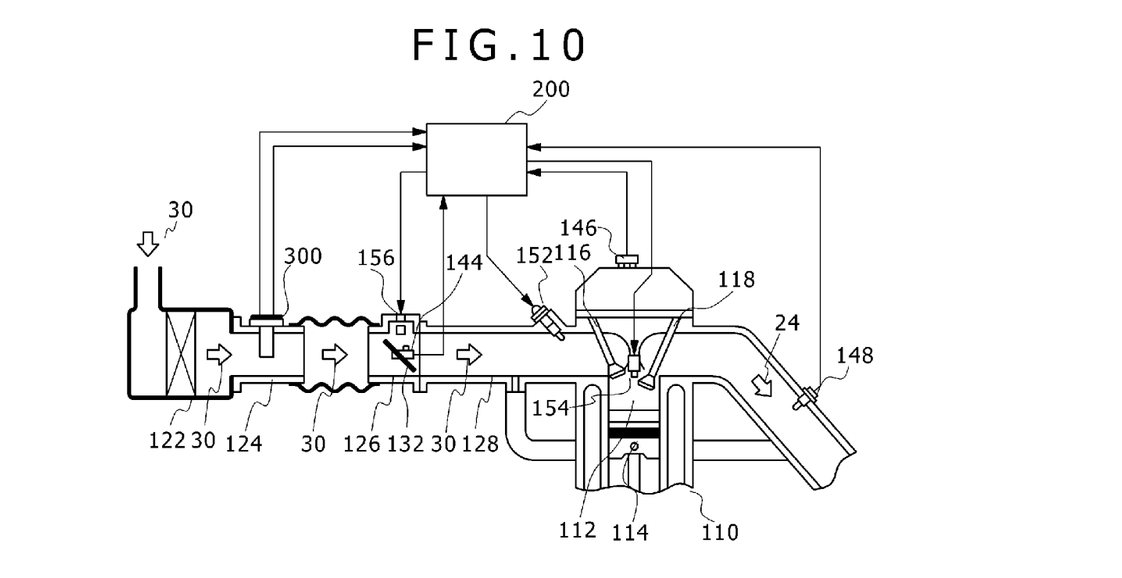
FIG. 10 is a system diagram showing an exemplary internal combustion engine control system to which a thermal air flow sensor according to the embodiment of the present invention is applied.

With reference to FIG. 10, the following describes a thermal air flow sensor 300 according to an embodiment of the present invention applied to a control system for an electronic fuel injection internal combustion engine. On the basis of an operation of an internal combustion engine 110 that includes an engine cylinder 112 and an engine piston 114, intake air as a measured gas 30 is drawn in from an air cleaner 122 and guided into a combustion chamber of the engine cylinder 112 via, for example, an intake pipe serving as a main passage 124, a throttle body 126, or an intake manifold 128. The thermal air flow sensor 300 according to the embodiment of the present invention measures a flow rate of the measured gas 30 serving as the intake air drawn into the combustion chamber. Fuel is supplied by a fuel injection valve 152 on the basis of the measured flow rate. The fuel is then guided into the combustion chamber together with the measured gas 30 as the intake air in a state of a mixture. In the embodiment, the fuel injection valve 152 is disposed at an intake port of the internal combustion engine. The fuel injected into the intake port forms a mixture with the measured gas 30 as the intake air. The mixture is guided into the combustion chamber via an intake valve 116 and burned so as to generate mechanical energy.

In recent years, the direct injection system has increased its use for its outstanding performance in exhaust purification and fuel economy. In the direct injection system, the fuel injection valve 152, mounted on the cylinder head of an internal combustion engine, directly injects fuel into each combustion chamber. The thermal air flow sensor 300 can be used in not only the system that injects fuel into the intake port of the internal combustion engine as shown in FIG. 10, but also the direct injection system that injects fuel directly into each combustion chamber. Both of these systems share a substantially identical basic concept of a method of measuring control parameters of the thermal air flow sensor 300, the method including how the thermal air flow sensor 300 is used, and another method of controlling the internal combustion engine, such as controlling a fuel supply amount and ignition timing. FIG. 10 shows the system that injects fuel to the intake port as an example representing those systems.

The fuel and air guided into the combustion chamber form a mixture of fuel and air. The mixture is burned explosively due to spark ignition by an ignition plug 154, thus generating mechanical energy. The gas after the combustion is guided into an exhaust pipe by way of an exhaust valve 118 and discharged as exhaust 24 to an outside of the vehicle through the exhaust pipe. The flow rate of the measured gas 30 as the intake air guided into the combustion chamber is controlled by a throttle valve 132 having an opening varied in accordance with an operation on an accelerator pedal. The fuel supply amount is controlled on the basis of the flow rate of the intake air guided into the combustion chamber. A driver can control an amount of mechanical energy generated by the internal combustion engine by varying the opening of the throttle valve 132 to thereby adjust the flow rate of the intake air guided into the combustion chamber.

The thermal air flow sensor 300 measures a flow rate and a temperature of the measured gas 30 as the intake air drawn in through the air cleaner 122 and flowing through the main passage (intake pipe) 124. The thermal air flow sensor 300 then applies electric signals indicating the flow rate and the temperature of the intake air to a controller 200. In addition, the controller 200 receives an input from a throttle angle sensor 144 that measures the opening of the throttle valve 132. The controller 200 further receives an input from an angular position sensor 146 in order to determine positions and conditions of the engine piston 114, the intake valve 116, and the exhaust valve 118 of the internal combustion engine, and a rotational speed of the internal combustion engine. Additionally, the controller 200 receives an input from an oxygen sensor 148 in order to determine a condition of an air-fuel ratio from a condition of the exhaust 24.

The controller 200 calculates a fuel injection amount and the ignition timing on the basis of the flow rate of the intake air as an output of the thermal air flow sensor 300 and the rotational speed of the internal combustion engine measured from an output of the angular position sensor 146. On the basis of the calculations, the fuel supply amount from the fuel injection valve 152 and the ignition timing at which ignition by the ignition plug 154 occurs are controlled. In practice, the fuel supply amount and the ignition timing are even more meticulously adjusted on the basis of changes in the intake temperature measured by the thermal air flow sensor 300 and the throttle angle, changes in the engine speed, and conditions of the air-fuel ratio measured by the oxygen sensor 148. While the internal combustion engine is in an idle state, the controller 200 further uses an idle air control valve 156 to control an amount of air that bypasses the throttle valve 132, to thereby adjust the rotational speed of the internal combustion engine in the idle state.

The fuel supply amount and the ignition timing that assume major control variables of the internal combustion engine are each calculated by use of the output from the thermal air flow sensor 300 as a main parameter. Improving measurement accuracy of the thermal air flow sensor 300, preventing the measurement accuracy from being changed over time, and enhancing reliability of the thermal air flow sensor 300 are thus crucial to improvement in control accuracy and reliability of the vehicle. In recent years, in particular, there have been mounting needs for fuel economy and for exhaust emissions purification. To meet these needs, it is extremely important to improve measurement accuracy of the flow rate of the measured gas 30 as the intake air measured by the thermal air flow sensor 300. It is also important that the thermal air flow sensor 300 maintains high reliability.

Vehicles on which the thermal air flow sensor 300 is mounted are subject to use under an environment that undergoes a considerable change in temperature and under wind, rain, or snow. When the vehicle runs on a snowy road, the road may be covered with an anti-freezing agent scattered thereon. Preferably, the thermal air flow sensor 300 should be adapted to respond to changes in temperature under its use environment and to dust, dirt, and contaminants. Furthermore, the thermal air flow sensor 300 is disposed in an environment subject to vibrations from the internal combustion engine and is thus required to maintain high reliability even with respect to the vibrations.

Additionally, the thermal air flow sensor 300 is mounted on the intake pipe susceptible to heat generated by the internal combustion engine. The heat from the internal combustion engine is thus transferred to the thermal air flow sensor 300 by way of the intake pipe serving as the main passage 124. The thermal air flow sensor 300 measures the flow rate of the measured gas through heat transfer with the measured gas. It is therefore important to prevent the thermal air flow sensor 300 from being thermally affected from the outside as much as possible.

Figure 9:
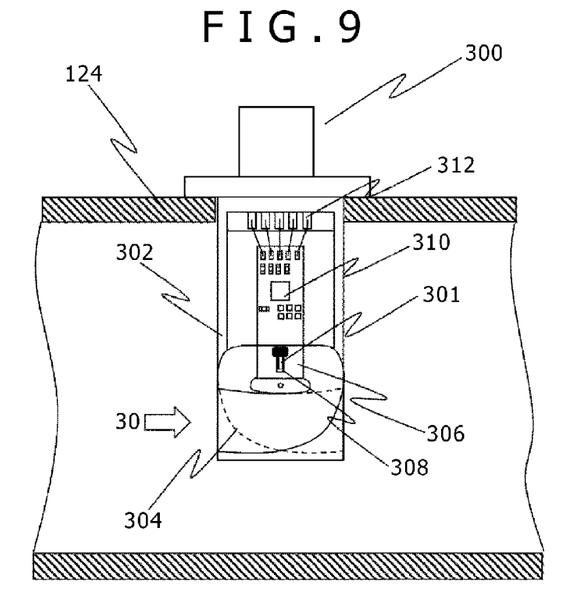
FIG. 9 is a cross-sectional view showing a thermal air flow sensor on which a measuring element is mounted.

The following describes, with reference to FIG. 9, an exemplary thermal air flow sensor 300 on which a measuring element 301 is mounted. As shown in FIG. 9, the thermal air flow sensor 300 is mounted so as to be inserted from a wall surface of the intake pipe 124. It is here noted that a housing member 302 is disposed so as to protrude from the wall surface of the intake pipe 124. The housing member 302 includes therein a sub-passage 304 in which part of the measured gas 30 as the intake air flowing through the intake pipe 124 is drawn. The sub-passage 304 is shaped to include a curved portion, but is linearly shaped in an area near the measuring element 301. A support member 306 that supports the measuring element 301 has a portion exposed in the sub-passage 304. The support member 306 has a rectangular recess 308 in which the measuring element 301 is disposed. The sub-passage 304 is linearly shaped in its portion at which the measuring element 301 is disposed and curved in portions upstream and downstream of the linear portion. A circuit chip 310 on which a driver/detection circuit of the measuring element 301 is mounted and chip components are mounted on the support member 306. The measuring element 301 is electrically connected to the support member 306 through, for example, an aluminum bonding wire. The support member 306 is also electrically connected through, for example, aluminum bonding wires, to connector terminals for extracting output signals. The support member 306 is, for example, a board-shaped substrate formed of a resin, ceramic, or metal.

Figure 1:
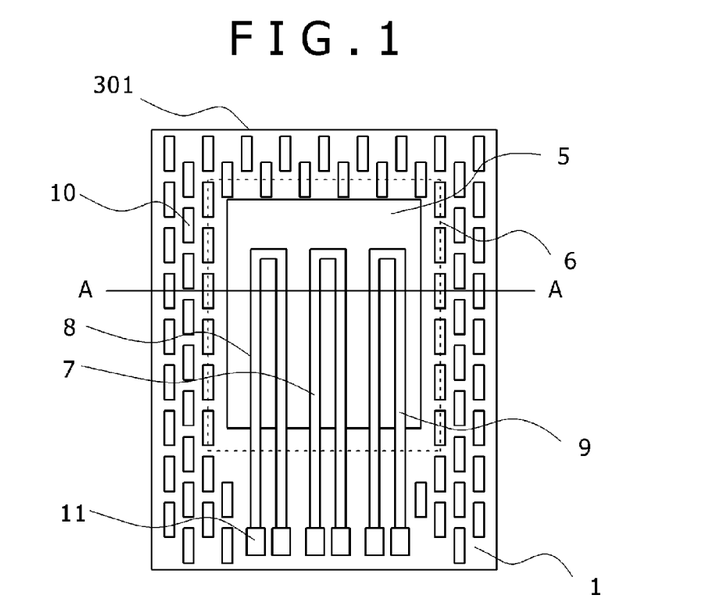
FIG. 1 is a schematic plan view showing a measuring element according to a first embodiment of the present invention.

The following describes, with reference to FIG. 1, the measuring element 301 of the thermal air flow sensor according to the first embodiment of the present invention. As shown in FIG. 1, the measuring element 301 includes a silicon substrate 1, a heating resistor 7, temperature measuring resistors 8 and 9 for measuring air temperature, dummy thin films 10, terminal electrodes 11, and a diaphragm portion 5. A back-side etching mask end portion 6 of the diaphragm portion 5 is shown by a broken line.

Figure 2:
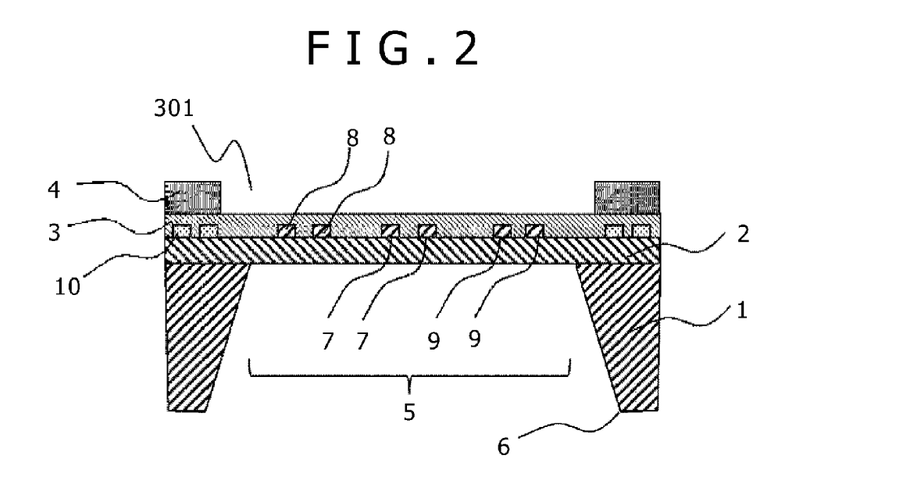
FIG. 2 is a cross-sectional view showing the measuring element according to the first embodiment of the present invention.

The following describes, with reference to FIG. 2, a method of fabricating the measuring element 301 according to the embodiment. The silicon substrate 1 is first subjected to thermal oxidation to thereby form a thermal oxide film 2 that assumes a lower electric insulating film. The heating resistor 7 and the temperature measuring resistors 8 and 9 are then formed over the thermal oxide film 2. The heating resistor 7 and the temperature measuring resistors 8 and 9 are each formed of, for example, a stack of platinum (Pt) thin films, molybdenum (Mo) thin films, or polycrystal silicon thin films.

The thin film is patterned to form the heating resistor 7 and the temperature measuring resistors 8 and 9 such that a ratio of a total area of the thin film pattern to an area of the measuring element 301 (thin film occupancy ratio) will be 40 to 60%. A width of the resistors of the heating resistor 7 and the temperature measuring resistors 8 and 9 on the diaphragm is determined by their electrical characteristics. Thus, preferably, a width of wire portions of these resistors (wires outside a region of the diaphragm portion 5) should be changed to form the dummy thin films 10 not electrically connected (but may be grounded), thereby to set the thin film occupancy ratio to 40 to 60%.

It should be noted that the lower electric insulating film below the thin films may include only the thermal oxide film 2. Alternatively, the lower electric insulating film may include a stack of a silicon nitride (SiN) film or a silicon oxide film ($SiO_2$).

A silicon oxide film 3 that assumes an upper electric insulating film is next stacked over the heating resistor 7 and the temperature measuring resistors 8 and 9 by means of plasma CVD method before thereafter being subjected to heat treatment at a temperature of 800 degrees Celsius or higher with the aim of densifying the film. As with the lower electric insulating film, the upper electric insulating film may include only the thermal oxide film 2. Alternatively, the upper electric insulating film may include a stack of a silicon nitride (SiN) film or a silicon oxide film ($SiO_2$). The film stack is subjected to heat treatment at a temperature of 800 degrees Celsius or higher with the aim of densifying the film.

A polyimide film 4 is then formed by stacking and patterning of a polyimide-based resin film. Contact holes are made in the upper electric insulating film after the silicon oxide film 3 has been formed. The terminal electrodes 11 shown in FIG. 1 are formed as a result of aluminum or gold (not shown), for example, being stacked in the contact holes. Lastly, the diaphragm portion 5 is formed from the back side with the use of a silicon oxide film and an etching solution such as KOH, for example, as a masking member (not shown). The diaphragm portion 5 may be formed by means of dry etching. Reference numeral 6 in FIG. 2 denotes the position of the back-side etching mask end portion serving as the masking member. An area outside the back-side etching mask end portion 6 is covered with a masking member 21 and etching is then performed. This procedure removes the silicon substrate 1 from the diaphragm portion 5.

Operational advantages of the embodiment will now be described below.

Figure 3:
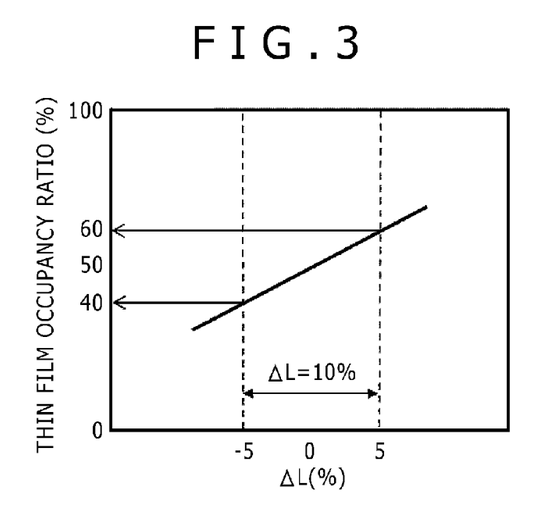
FIG. 3 is a graph showing a thin film occupancy ratio and variations in dimension.

Due to restrictions involved on measurement accuracy of the thermal air flow sensor 300, preferably, a dimensional variation $\Delta L$ of the thin film pattern, such as the platinum (Pt) film, the molybdenum (Mo) film, and the polycrystal silicon film, should be held within 10% or less with respect to the mask dimension. To keep the dimensional variation $\Delta L$ of the thin film pattern within 10% or less, the thin film occupancy ratio should range between 40% and 60% as is learned from FIG. 3. Keeping the thin film occupancy ratio in the range between 40% and 60% reduces the dimensional variation $\Delta L$, so that a thermal air flow sensor that prevents flow rate measurement accuracy from being degraded due to the dimensional variation and that offers high flow rate measurement accuracy can be provided.

Figure 4:
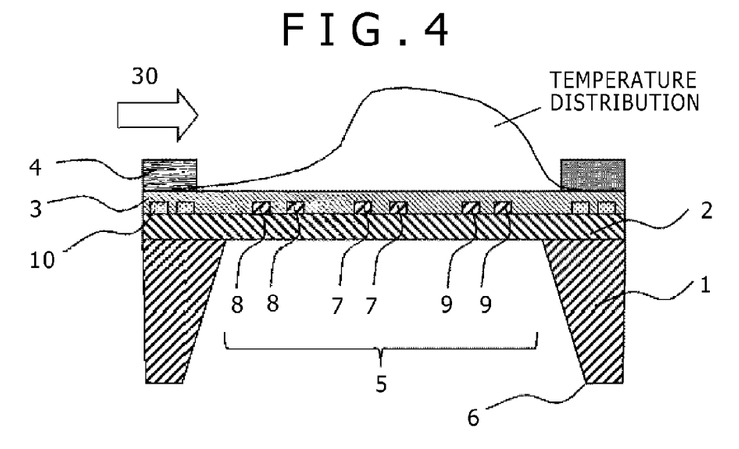
FIG. 4 is a diagram illustrating a principle of measurement by a thermal air flow sensor.

FIG. 4 shows a principle of measurement of the air flow rate when the thermal air flow sensor 300 is employed. The thermal air flow sensor 300 heats the heating resistor 7 to thereby measure the air flow rate above the measuring element 301. If the measured gas 30 as the intake air flows from the upstream side of the heating resistor 7, a temperature distribution will be asymmetrical as shown in FIG. 4 because of an exchange of heat between the heating resistor 7 and the measured gas 30, resulting in a difference in temperature occurring between a position at which the temperature measuring resistor 8 has been formed and a position at which the temperature measuring resistor 9 has been formed. This temperature difference depends on the air flow rate, which allows the air flow rate to be calculated from the temperature difference. As shown in FIG. 1, the thermal air flow sensor 300 includes the heating resistor 7 and the temperature measuring resistors 8 and 9 formed over the diaphragm portion 5. This arrangement avoids the following possible problems. Specifically, the silicon substrate 1 with a high thermal conductivity being present below the heating resistor 7 and the temperature measuring resistors 8 and 9 will result in an increased heat capacity, a lower temperature of the air above the heating resistor 7 relative to a design value, a greater measurement error in the air temperature measured by the temperature measuring resistors 8 and 9, and a slower measurement response speed.

In a case where the dummy thin films 10 are formed around the heating resistor 7 and the temperature measuring resistors 8 and 9 over the diaphragm portion 5 to make the thin film occupancy ratio fall within the range of 40 to 60%, the dummy thin films 10 would cause heat to be taken away because of a thermal conductivity of the dummy thin films 10 higher than a thermal conductivity of the surrounding films, which could pose problems similar to those described above. Thus, preferably, the dummy thin films 10 should be formed over the silicon substrate 1 and not on the diaphragm portion 5 to thereby make the thin film occupancy ratio range between 40% and 60%. This arrangement allows a thermal air flow sensor offering high flow rate measurement accuracy to be provided.

Figure 5:
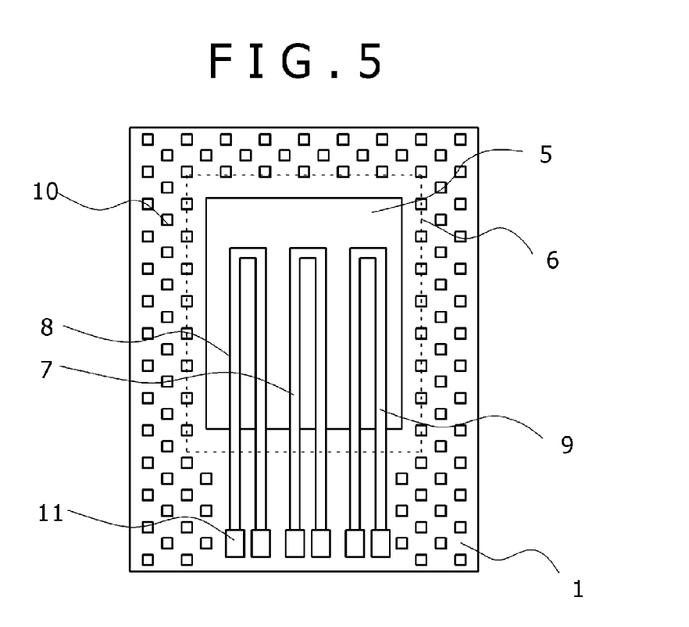
FIG. 5 is a diagram showing another thin film pattern.
Figure 6:
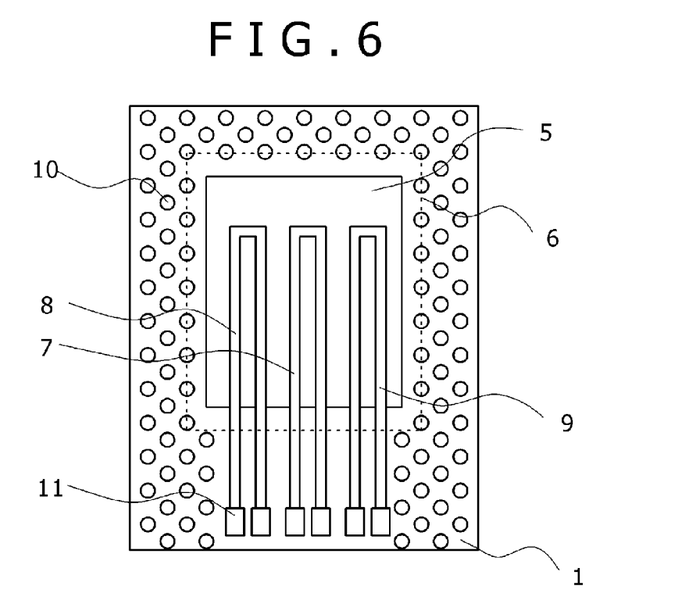
FIG. 6 is a diagram showing still another thin film pattern.

It is effective in reducing the dimensional variation $\Delta L$ of the heating resistor 7 and the temperature measuring resistors 8 and 9 if the pattern of the dummy thin films 10 is evenly disposed over the entire measuring element 301 rather than the pattern being concentrated in several locations on the measuring element 301, in order to make the thin film occupancy ratio range between 40% and 60%. For this reason, the dummy thin films 10 in a zigzag pattern as shown in FIG. 1 are particularly effective. In FIG. 1, each of the dummy thin films 10 is a rectangle; nonetheless, each of the dummy thin films 10 may be a circle or a quadrilateral as shown in FIGS. 5 and 6. Alternatively, the dummy thin films 10 may even be a criss-cross pattern.

The dimensional variation ΔL of the thin film pattern is affected more at smaller dimensions of the thin film. The present invention is particularly advantageous in a product having a minimum pattern width of 1 μm or less of the heating resistor 7 or the temperature measuring resistors 8 and 9. Understandably, the dimensional variation ΔL can be minimized, as long as each pattern of the dummy thin films 10 is formed to have a width identical to a minimum width (a minimum processing dimension on the chip) of the thin film pattern of heating resistor 7 and the temperature measuring resistors 8 and 9, and as long as the patterns of the dummy thin films 10 are spaced apart from each other as in the thin film pattern of the heating resistor 7 and the temperature measuring resistors 8 and 9.

REFERENCE NUMERALS 1 silicon substrate
2 thermal oxide film
3 silicon oxide film
4 polyimide film
5 diaphragm portion
6 back-side etching mask end portion
7 heating resistor
8 temperature measuring resistor
9 temperature measuring resistor
10 dummy thin film
11 terminal electrode
300 thermal air flow sensor
301 measuring element

The invention claimed is:

1. A thermal air flow sensor including a measuring element, the measuring element comprising:
   a semiconductor substrate;
   a heating resistor and a temperature measuring resistor both formed as a result of thin films being stacked over the semiconductor substrate;
   an electronic insulator including a silicon oxide film;
   a diaphragm portion formed after part of the semiconductor substrate is removed; and
   a thin film formed of a material identical to a material used for the temperature measuring resistor, wherein
      the heating resistor and the temperature measuring resistor are formed over the diaphragm portion,
      the thin film occupies an area relative to the area of the measuring element at a ratio ranging between 40% and 60%, and
      the thin film formed of the material identical to the material used for the temperature measuring resistor are not electrically connected to other portions.

2. The thermal air flow sensor according to claim 1, wherein the thin film formed of the material identical to the material used for the temperature measuring resistor is arrayed in a zigzag pattern.

3. The thermal air flow sensor according to claim 2, wherein the thin film arrayed in the zigzag pattern has a rectangular shape.

4. The thermal air flow sensor according to claim 2, wherein the thin film arrayed in the zigzag pattern has a quadrilateral or circular shape.

5. The thermal air flow sensor according to claim 1, wherein the thin film formed of the material identical to the material used for the temperature measuring resistor is disposed on the semiconductor substrate outside the diaphragm portion.

* * * * *